C. GENTLE.
TRUCK PROVIDED WITH SPECIAL BALL BEARINGS.
APPLICATION FILED SEPT. 9, 1908.

912,463.

Patented Feb. 16, 1909.
2 SHEETS—SHEET 1.

C. GENTLE.
TRUCK PROVIDED WITH SPECIAL BALL BEARINGS.
APPLICATION FILED SEPT. 9, 1908.
912,463.
Patented Feb. 16, 1909.
2 SHEETS—SHEET 2.
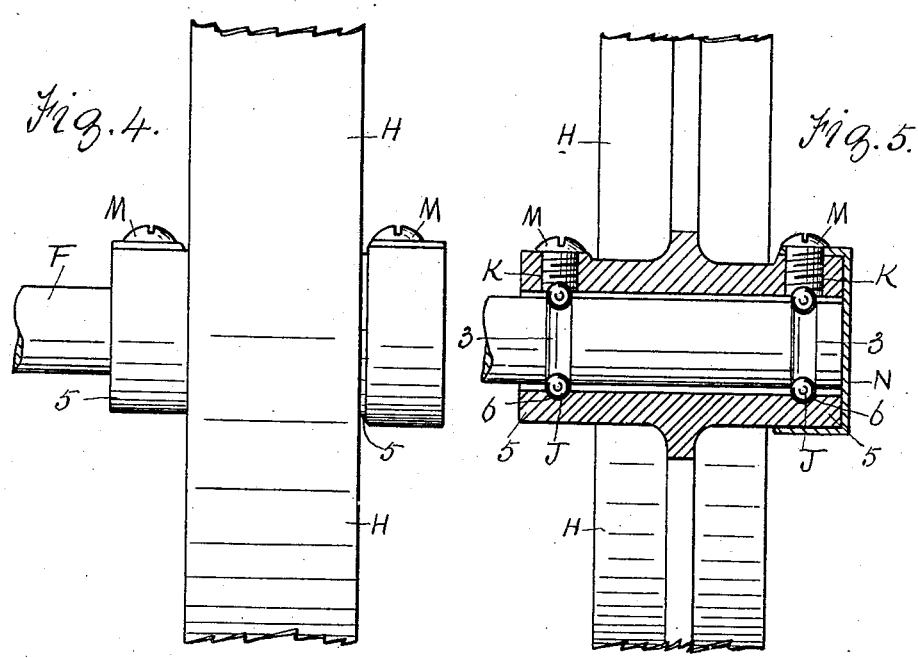
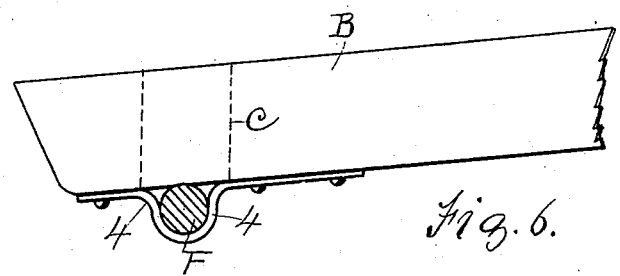
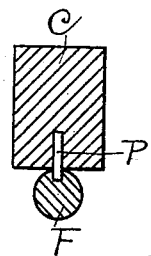
Witnesses.
Thos Murphy
Fred Taylor
Inventor.
Charles Gentle
By John K Hendry
His Attorney.

UNITED STATES PATENT OFFICE.

CHARLES GENTLE, OF HAMILTON, ONTARIO, CANADA.

TRUCK PROVIDED WITH SPECIAL BALL-BEARINGS.

No. 912,463.  Specification of Letters Patent.  Patented Feb. 16, 1909.

Application filed September 9, 1908. Serial No. 452,298.

*To all whom it may concern:*

Be it known that I, CHARLES GENTLE, a subject of the King of Great Britain, and resident of Hamilton, in the county of Wentworth and Province of Ontario, Canada, have invented new and useful Improvements in Trucks Provided with Special Ball-Bearings, of which the following is a specification.

My invention relates to trucks provided with special ball bearings, and consists of a framework having suitable rear handles and a forward transverse stationary axle provided with side wheels adapted to rotate on ball bearings on said axle and on the ground.

The objects of my invention are, first,. to provide a wheel having two sets of ball bearings, comparatively wide apart, adapted to rotate on a stationary axle of a truck, thereby steadying the rim of the wheel and preventing any side movement to the same, second, to provide means for inserting the ball in position between the hub of the wheel and the stationary axle, third, to provide means for keeping the bearings intact from any foreign substance. I attain these objects by the mechanism illustrated in the accompanying drawing in which:—

Figure 1:
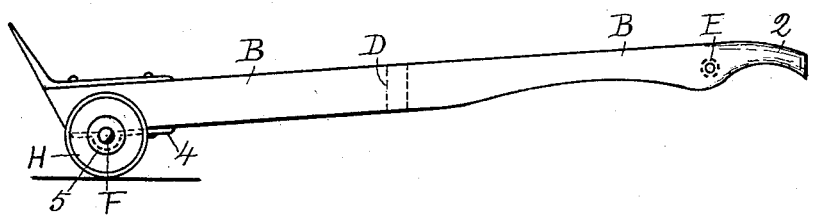
Figure 2:
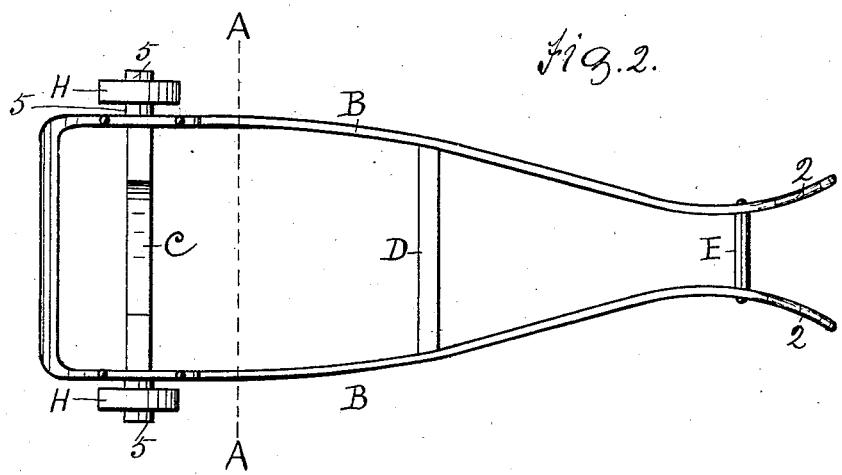
Figure 3:
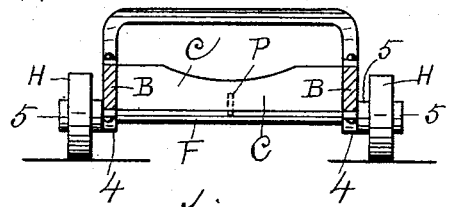

Figure 1 is an elevation of a hand truck. Fig. 2 is a plan of the same showing the side wheels on the forward ends of the frame, and the opposite ends of the frame brought considerably closer together and curving toward each other to receive a transverse handle, then diverging apart to form curved end handles. Fig. 3 is a sectional end elevation of the wheel end of the truck through the broken line A, A, of Fig. 2 of the drawing. Fig. 4 is an enlarged face elevation of one of the wheels of the truck, on its axle. Fig. 5 is an enlarged sectional elevation of the same. Fig. 6 is an enlarged detail side elevation of one end of the frame showing how the axle is secured to the frame and to the transverse axle rail, show in broken lines. Fig. 7 is an enlarged detail section of the transverse axle rail showing means to prevent the axle from moving endwise.

Similar characters refer to similar parts throughout the several views.

In the drawing B is the frame of the truck, and comprises sides B, which are held a suitable distance apart by the forward transverse rail C, the centrally located and similar transverse rail D, and a transverse handle E. The sides B are curved to the handle E, and at this part are only sufficiently apart to easily admit the hand on the handle E. The sides A, then diverge from the handle E, and form two curved side handles 2.

F is the stationary axle having annular grooves 3, a distance apart, and is rigidly secured to the underside of the wheel end of the frame, by means of axle brackets 4, which are secured to the frame.

H are the side ground wheels, the rims of which are shown broken, in Figs. 4 and 5 of the drawing, and may be of suitable diameter and breadth to suit various sizes and shapes of trucks.

The side wheels have suitable hubs 5, which extend beyond the rims of the wheels. I will here describe one side wheel H, as both are identical. The bore of the hub 5, is larger in diameter than is the axle F, and in the hub are grooves 6, opposite to the grooves 3, of the axle, and conform therewith. J, are ball bearings fitting in said grooves and adapted to revolve and rotate therein. It will be noticed that the axle and hub are devoid of any cones and sleeves of any kind, and that the hub and axle are each solid and do not contact with each other in any part, the balls being the only medium of contact. K, are parallel vertical openings in the hubs 5, and opposite to the grooves 6 in said hub. The openings K are larger in diameter than the balls J, and are for the purpose of admitting the balls to position, and large enough to admit larger balls in case the grooves in the axle and in the hub become possibly larger through wear of the grooves by the rotary motion of the balls. The openings K also serve as oil holes for oiling the ball bearings. The openings K are provided with removable screwed plugs M, the inner ends of which are concaved to conform to the round balls, and in consequence of the plugs M being of larger diameter than the balls the ends of the plugs do not form a feather edge, to contact with and impede the balls, but have a surface. The axle on one side of the wheel terminates flush with the hub, and an end cap N is provided which contacts with the end of the axle and the hub and extends around the hub in close position and secured thereto by means of a plug M. The cap N, is for the purpose of preventing dust and other foreign matter from entering the ball bearings. The parts of the hub containing the plugs are heavier than the other parts of the hub, to afford a prominent solid thickness of metal for the stability of said plugs.

In Fig. 7 of the drawing a pin P is shown secured in the axle F and extending into the axle rail C to retain the axle in definite position.

The most important feature of this invention is the fact that the ball bearings must extend beyond the rim of the wheel, and equally divided beyond said rim, in order to afford perfect steadiness to the rim, and to allow the holes K to be drilled and screwed parallel with each other and in consequence the said holes can be drilled and screwed without the drilling tools and other mechanism employed for the purpose, contacting with, or interfering with the rim of the wheel.

What I claim as my invention and desire to secure by Letters Patent, is:—

1. A truck comprising a frame, an axle secured thereto, a transverse bar forming a part of the frame and over said axle, a centrally located pin in the axle and in the bar to prevent side or lateral movement of the axle, a rotary wheel on the axle, grooves in the bore of the hub of the wheel spaced apart and beyond the rim of the wheel to steady said rim, annular grooves in the axle to conform to the grooves in the wheel, parallel openings through said hub and opposite to the grooves, removable plugs in the openings to admit and to retain said balls in the grooves.

2. In a truck, a frame, the sides of one end of the frame curving toward each other and brought in contiguity with each other to form handles, a transverse handle between said nearest parts of the handles and sufficient only to allow one hand between said side handles, a stationary transverse axle on the opposite end of the frame and wheels adapted to rotate on the axle, substantially as described.

CHARLES GENTLE.

Witnesses:
JOHN H. HENDRY,
RICHARD BUTLER.